March 4, 1952 F. A. HESTER 2,587,617

DISTORTION COMPENSATING DEVICE FOR FACSIMILE EQUIPMENT

Filed May 29, 1947 2 SHEETS—SHEET 1

FRANK A. HESTER
*INVENTOR.*

BY Alfred W. Barber
ATTORNEY

DISTORTION COMPENSATING DEVICE FOR FACSIMILE EQUIPMENT

Filed May 29, 1947

FRANK A. HESTER
*INVENTOR.*

BY Alfred W. Barber
ATTORNEY

Patented Mar. 4, 1952

2,587,617

UNITED STATES PATENT OFFICE 2,587,617

DISTORTION COMPENSATING DEVICE FOR FACSIMILE EQUIPMENT

Frank A. Hester, New York, N. Y., assignor to Faximile, Inc., New York, N. Y., a corporation of Delaware Application May 29, 1947, Serial No. 751,421

4 Claims. (Cl. 178—5)

The present invention concerns electrical circuits and, in particular, circuits for improving the definition in facsimile recording systems and the like.

In facsimile systems and the like, material to be transmitted to a distant point and reproduced is effectively scanned by a small spot of light covering an elemental area of the copy at a time. The light transmitted through the copy or reflected from the copy is directed to a photo-electric cell by a suitable lens system and variations in the photo-electric cell output due to variations in density in the elemental scanning area are utilized to actuate a transmitting device. The scanning is usually accomplished in a series of parallel lines successively covering the subject matter. At the reproducing or recording end the received signals are reproduced, for instance, by scanning an electrically sensitive sheet and impressing upon it the signal variations representing the original copy. The scanning spot at the recorder normally has the same dimensions as, and should move in synchronism with, the scanning spot at the transmitter in order to reproduce faithfully the original copy upon the recording sheet.

In facsimile systems and the like, "definition" may be defined as the number of scanning lines per inch of copy in one direction, and as the maximum number of elemental areas per inch of copy in a direction at right angles to the first direction, which are capable of generating a marking signal of full value. Thus, definition is determined by the size of the elemental area scanned at any instant which in turn is determined by the size of the scanning aperture. The finest definition theoretically obtainable from a facsimile scanner is that where the signal generated in a photo-electric cell, as it scans a line of any finite width, is a square wave of constant amplitude with infinitely small periods of rise and fall. Since an aperture infinitely small in width is not possible from a practical standpoint, the rise and fall time will always have a finite value. Thus, at a given transmission speed, the larger the aperture, the longer the periods of rise and fall. Since the band width allowed for transmission of facsimile signals is usually limited, compromises on transmission speeds and definition commercially acceptable may result in, for example, one hundred five lines per inch at approximately twenty seven square inches per minute, or a maximum elemental frequency of approximately three thousand cycles per second. Where the width of the area of optical density being scanned is equal to the width of the defining aperture the wave shape generated will be triangular with a base equal in time to twice the width of the aperture. Wider areas will result in a trapezoidal form of full amplitude while narrower areas will result in a trapezoidal form with a maximum amplitude something less than that required to mark with full optical density. Consequently, the generated signal will comprise a combination of trapezoidal and triangular wave forms representing different values of optical density where each change is represented by a period of rise or fall. In the example given each of these periods would always be equal to $^1/_{6000}$ of a second.

The definition obtainable in a given facsimile system may be limited by limiting the extent of the spectrum transmitted from scanner to recorder. For example, even when scanning with a very fine aperture if no frequencies above three thousand cycles per second are transmitted, the rise time and the fall time of the wave may be made equal to $^1/_{6000}$ of a second. In this case the definition may be said to be limited electronically, and the wave form generated by the small elemental area will be sinusoidal in shape.

For purposes of economy it is usually desirable to transmit as narrow a band of frequencies as possible and achieve the required definition.

The greater the speed of facsimile transmission the greater the frequency bandwidth required for a given definition. In a well designed facsimile system of a given definition, the speed of transmission is at the limit determined by bandwidth, or, expressed another way, the bandwidth is as narrow as can provide the desired speed and definition. Spot speed in inches per second multiplied by the definition in pairs of alternate black and white dots per inch equals the graphic elemental frequency. A facsimile system must have a bandwidth at least equal to the elemental frequency. If the bandwidth is only equal to the elemental frequency, the signal corresponding to each pair of black and white dots cannot be a cycle of a square wave; it is one sine wave cycle of the highest frequency passed by the system. Similarly when a larger black spot is scanned, the slopes of the signal cannot be steeper than that of a sine wave of the highest frequency passed.

In order to more faithfully reproduce the copy, it has always been the practice in the art to design a facsimile system with a slow enough speed or a low enough defintion so that third and possibly fifth harmonics of the elemental frequency would be passed by the bandwidth available or economically justified. By passing the odd harmonics, the slopes of the signal waveform corresponding to changes in graphic density are steepened.

According to the present invention, it is not necessary to pass odd harmonics of the elemental frequency. With a given available bandwidth, the invention permits a greatly increased speed of transmission or a greatly improved definition. Or, expressed another way, a given speed of transmission and definition can be achieved with a much smaller bandwidth.

According to this invention, the signal waveforms at points corresponding to changes in graphic density are steeper than heretofore could have been achieved with an equivalent bandwidth spectrum. The resulting waveforms, in addition to having steep fronts, have overshoot portions which impart a crisp and pleasing character to the recordings produced therefrom.

In facsimile transmissions involving only variations in optical density from full white to full black, such as, for example, printed materials, maps, etc., it is necessary to transmit only the fundamental frequency generated by the elemental area, inasmuch as the high frequency components can be restored at the receiving end by amplification and threshold and peak limiting, thus restoring the square character of the wave; or, which is the same thing, decreasing the time of the rise and fall of the wave by electronic means.

In facsimile transmissions involving material which exhibits continuous variation in optical density from full white to full black, such as photographs and the like, if limiting means were employed to increase the definition, the reproduction would obviously be either full white or full black and would not preserve the continuous variations in optical density. In such systems involving the transmission of photographic material it has been common practice to transmit at least the third and often the fifth harmonic of the elemental area frequency so as more nearly to preserve the desired wave shape. This, however, results in the transmission of a spectrum which is either three or five times as great as is required with the black and white system.

It is one object of the present invention to improve detail in a facsimile copy transmitted with a minimum band width and yet substantially preserve the fidelity of photographic reproduction.

Another object is to provide a simple and inexpensive circuit for greatly improving the definition and reproduction from a conventional facsimile signal or the like.

A still further object is to provide circuits for correcting distortion due to the finite aperture at the pick-up end of the system.

A further object is to provide circuits for restoring the wave form lost due to lack of transmission of high frequencies in a facsimile system or the like.

These and other objects of the present invention will be apparent from a detailed description of the invention given in connection with the various figures of the drawings.

According to the present invention the rise and fall time of the signal is decreased to increase the definition of the recorded signal. The present invention may, also, restore partially the harmonics necessary to reproduce a square wave representing a black line at the limits of definition of the system and lost due to a limited band in transmission. The present invention may be practiced in a number of ways as, for instance, by utilizing the characteristics of a capacitance in conjunction with a resistance or inductance to reduce the periods of rise and fall of the signal of any amplitude to a fraction of that normally required.

Figure 1:
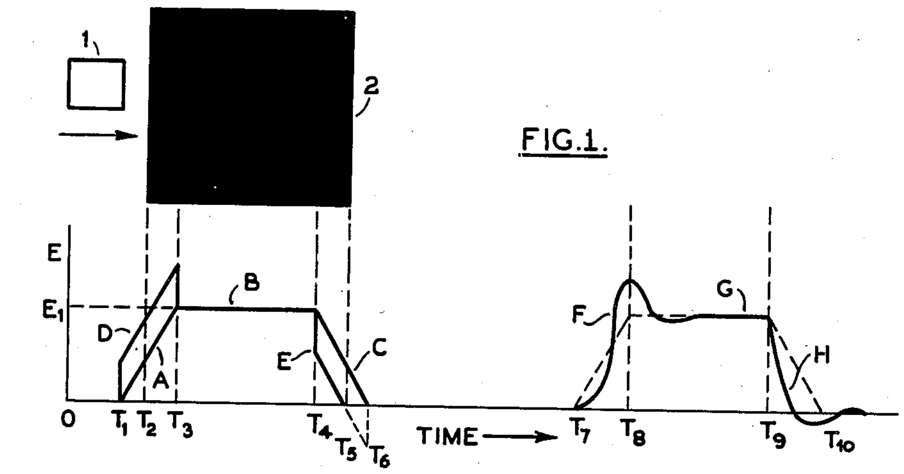
Fig. 1 shows various curves useful in explaining the operation of the present invention.

Fig. 1 shows a representation of an elemental scanning area 1, about to pass over a black line 2, in the direction of the arrow. For purposes of illustration it will be assumed that the size of scanning area 1, and the speed with which it is travelling across line 2 is such that it requires $^1/_{6000}$ of a second for it to pass over the boundary of the line 2 in the direction of scanning as shown by the arrow. Also in Fig. 1 are two curves illustrating the operation of the present invention in which voltage is plotted vertically against time shown horizontally. Curve A—B—C shows the signal current generated as the scanning area passes over line 2. According to the illustration, therefore, the time $T_1$ to $T_3$ and the time from $T_4$ to $T_6$ will be $^1/_{6000}$ of a second. Thus, portion A of the curve represents the maximum rate in which the signal can rise due to the limitation of the aperture size and portion C represents the maximum rate at which the signal can decrease. According to the present invention the rate of rise and the rate of fall of the signal is to be actually or apparently increased so that the actual or apparent signal more nearly approximates the theoretical shape which it should have. Since the greatest amount of correction is required where the rate of rise or fall is a maximum the system is designed to increase the rate of rise or fall a maximum for these maximum rates of signal change. According to one embodiment of the present invention, portion A of the curve A—B—C may be made to jump up suddenly a finite distance and then follow a slope parallel to A to a point considerably above $E_1$ as shown by curve D, and to fall with a sudden initial drop and then a slope parallel to C as shown by curve E. Since $E_1$ represents the maximum density of recording the apparent rise time is shortened from initial value of $T_1$ to $T_3$ a new value of $T_1$ to $T_2$, and the decay time, since the signal cannot go below zero, is apparently decreased from $T_4$ to $T_6$ to a new value of $T_4$ to $T_5$. It will be seen that, although the signal overshoots both in a positive and negative direction, due to the response of the recording sheet the apparent rise and fall time has been decreased to approximately half its initial value. In fact, by causing the signal to overshoot by approximately fifty percent the rise or fall time has been decreased approximately fifty percent. In the right hand portion of Fig. 1 is shown a similar curve G with a rise time $T_7$ to $T_8$ and a decay time of $T_9$ to $T_{10}$. According to another embodiment of the invention a damped oscillation is produced which both overshoots and reduces the rise and fall time of the signal as shown by F at the rising portion of the curve and H at the decay portion of the curve. As before, by overshooting by approximately fifty percent the rise and fall time has been reduced approximately fifty percent.

Figure 5:
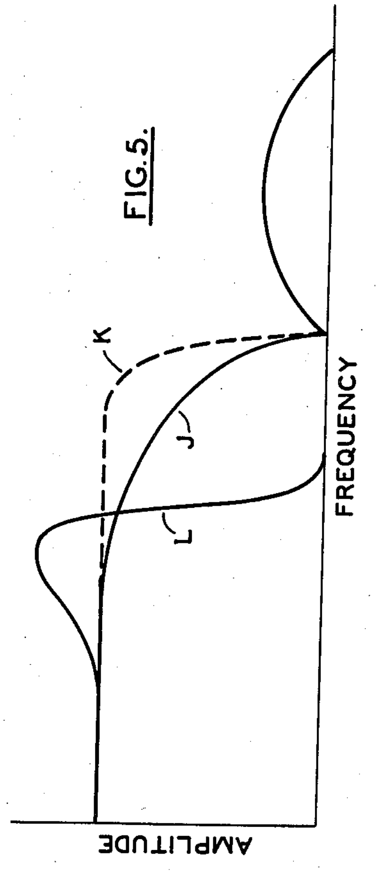
Fig. 5 shows curves to further illustrate the operation of the present invention.

Fig. 5 shows another method of illustrating the functioning of the present invention. Curve J is a plot of signal amplitude versus frequency showing the effect of aperture distortion upon the frequency spectrum of the generated signal. Curve J falls to zero when the length of the aperture is equal to one wave length of the frequency generated due to the scanned copy. Curve J may also be considered to represent the band pass characteristic of the facsimile system. The speed or definition of a facsimile system may be limited either by the size of the scanning aperture or by the frequency bandwidth of the system. Previous attempts to overcome the effect in systems of this kind have been along the line of flattening curve J, bringing it up at the high frequency end to have a characteristic somewhat as shown at K. According to the present invention, instead of trying to correct the frequency response as above described, a much smaller frequency range is utilized, and by giving the curve a sharply rising characteristic as shown at L the improvements herein described may be realized. Curve L rises sharply to a point considerably above any point which would obtain to a flat frequency characteristic and then falls at a point considerably short of the theoretical zero point of curve J. The maximum response point, for example, may be made to come at approximately one-half of the original cut-off frequency. The maximum response point should be at a frequency in cycles per second equal to the graphic elemental frequency which is defined in the art as the spot speed in inches per second multiplied by the definition in pairs of alternate black and white dots per inch. According to this invention, as is apparent from the drawing, odd harmonics of the elemental frequency are not relied on to provide speed or definition. The elemental frequency is substantially as great as the effective bandwidth of the system.

Figure 2:
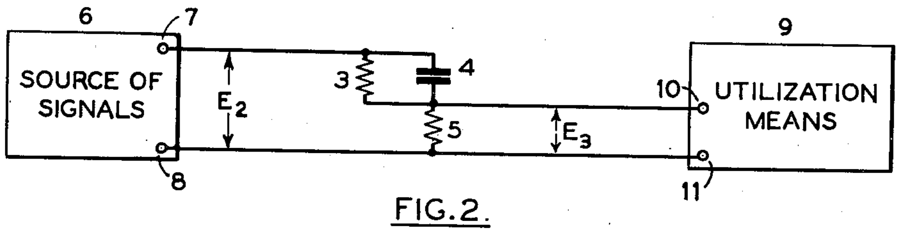
Fig. 2 shows a circuit embodying one form of the present invention.

Fig. 2 shows a circuit embodying one form of the present invention. Between a source of signal 6 having output terminals 7 and 8 and a utilization means 9 having input terminals 10 and 11 is connected a differentiating circuit consisting of resistor 3 and shunting capacitor 4 in series with resistor 5. The input signal $E_2$ from source 6 is applied across a series combination and the output signal $E_3$ is taken off across resistor 5. If the value of resistor 5 is made low compared to the reactance of capacitor 4 at the upper frequency limit which it is desired to compensate, a curve as shown at D in Fig. 1 will be obtained. The vertical portions of curve D, the overshoot and hence the apparent increase in slope of the resulting curve may be controlled by the relative values of capacitor 4 and resistor 5. The amplitude of the flat portion B of the curve is controlled by the relative values of resistors 3 and 5.

Figure 3:
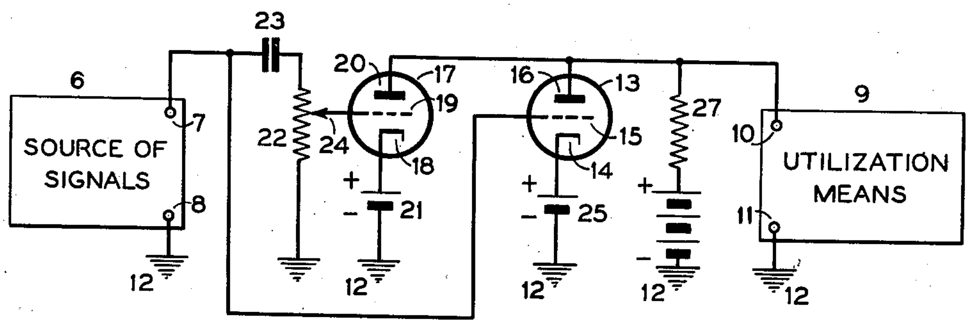
Fig. 3 shows a circuit embodying a modified form of the present invention.

Fig. 3 shows another embodiment of the present invention which is somewhat more flexible than the circuit shown in Fig. 2. Signals derived from the source of signal 6 which it is desired to compensate, as described above, are applied to two tubes 17 and 13 having their plates 20 and 16 connected in parallel across the common load 27 and feeding a utilization means 9. The complete signal is applied to grid 15 of tube 13 while the differentiated portion is applied to grid 19 of tube 17 through series capacitor 23 and across an adjustable portion of resistor 22. Resistor 22 corresponds to resistor 5 of Fig. 2 and capacitor 23 corresponds to capacitor 4 of Fig. 2 each having a corresponding function. By varying the position of tap 24 on resistor 22 the amount of overshoot and hence the apparent sharpening of the slope of the signal curve may be closely controlled. An adjustment may be made to compensate the aperture characteristic and subject matter characteristics in any given system or at any given time of transmission.

Figure 4:
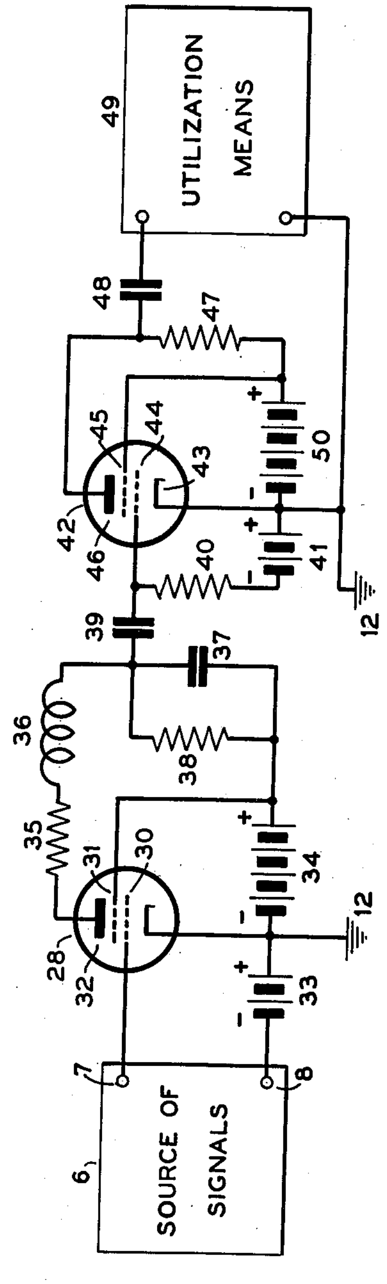
Fig. 4 shows a circuit embodying a still further modification of the present invention.

Fig. 4 shows a still further modification of the present invention in which facsimile signals from a source 6 are to be compensated and applied to utilization means 49. In this case the damped oscillation type of compensation as shown at F and H of Fig. 1 is utilized. One convenient manner in which this damped oscillation may be generated is by means of a series circuit consisting of resistor 35, inductor 36 and capacitor 37 connected in series as a load for plate 32 of amplifier tube 28. Resistor 33 is made large and serves chiefly to supply plate voltage from plate battery 34 to plate 32. Resistor 35 acts as a damping resistor and is chosen to give a low "Q" to the series circuit. When signals of the type above described are impressed upon grid 30 of tube 28 a damped oscillation is set up in the plate circuit and the voltage appearing across capacitor 37 will have a form as shown in F and H of Fig. 1. This voltage is applied to grid 44 of amplifier tube 42 through a suitable means such as coupling capacitor 39 and from plate 46 of amplifier tube 42 to utilization means 49 through suitable means such as coupling capacitor 48. The values of inductor 36 and capacitor 37 are chosen to resonate at a frequency approximately one-half the cut-off frequency of curve J in Fig. 5 and the resulting frequency response will be similar to that shown by curve L in Fig. 5.

It is thus apparent that according to the present invention the real and apparent detail of a facsimile system or the like may be greatly improved in a simple and effective manner and without increasing the frequency range required. The amount of improvement may be readily controlled to meet various requirements. The real and apparent improvement in sharpness of contrast is accomplished without sacrifice to fidelity in the transmission of half tone copy, since the maximum increase in signal slope is only produced wherever the original signal has maximum slope as at a full white to full black boundary.

While several embodiments of the present invention have been shown and described, other variations will be apparent to those skilled in the art as within the spirit and scope of the invention as set forth in the appended claims.

What is claimed is:

1. In a recording amplifier of a facsimile system, a source of a facsimile signal varying in amplitude in accordance with variations in graphic density, a waveform changing circuit receptive to the signal from said source and operative responsively to each change in amplitude of said signal from a first level to a second level to generate a wave extending momentarily beyond said second level and then returning to said second level, and facsimile recording means receptive to the output of the waveform changing circuit, whereby changes in graphic density are emphasized in the recording.

2. In the recording amplifier of a facsimile system having an elemental frequency $f$, a source of a facsimile signal varying in amplitude in accordance with variations in graphic density subject to the limitation of not including frequency components substantially in excess of frequency $f$, a waveform changing circuit receptive to said signal and operative to generate a waveform differing from the one received in that the slopes of the waveform are steeper and in that momentary overshoots accompany changes in amplitude, and facsimile recording means receptive to the output of the waveform changing circuit, whereby the frequency bandwidth channel of the facsimile system may be economized to exclude odd harmonics of the frequency $f$.

3. In facsimile communications, the method of recording which comprises the steps of receiving a facsimile signal modulated in amplitude in accordance with graphic density subject to the limitation of not including frequency components substantially greater than a frequency of $f$ cycles per second, changing the waveform to the extent of steepening slopes and momentarily overshooting changes from one level to another, and applying the changed waveform to recording apparatus, whereby recordings may be made having a quality represented by an elemental frequency equal to $f$ cycles per second where elemental frequency is equal to the spot speed in inches per second multiplied by the definition in pairs of alternate black and white dots per inch.

4. In the recording amplifier of a halftone facsimile system having a maximum effective elemental frequency $f$ determined by aperture distortion or bandwidth limitations, or the like, the combination of a source of facsimile signal varying in amplitude in accordance with variations in graphic density subject to the limitation of not including frequency components substantially in excess of frequency $f$, a waveform changing circuit receptive to said signal comprising a resistor, an inductor and a capacitor connected in series, the values being selected to resonate substantially at frequency $f$, means for taking an output from across said capacitor, the output waveform differing from the input waveform to the waveform changing circuit in that the slopes are steeper and in that momentary overshoots accompany changes in amplitude, and facsimile recording means receptive to said output, whereby the frequency bandwidth channel of the facsimile system may be economized to exclude odd harmonics of the elemental frequency $f$.

FRANK A. HESTER.

REFERENCES CITED

The following references are of record in the file of this patent:

UNITED STATES PATENTS

| Number | Name | Date |
|---|---|---|
| 1,516,518 | Carson | Nov. 25, 1924 |
| 1,717,624 | Ranger | June 18, 1929 |
| 2,167,136 | Wheeler | July 25, 1939 |
| 2,183,203 | Poch | Dec. 12, 1939 |
| 2,202,361 | Verbeek et al. | May 28, 1940 |
| 2,240,605 | Bingley | May 6, 1941 |
| 2,301,199 | Bruce et al. | Nov. 10, 1942 |
| 2,332,919 | Kleen | Oct. 26, 1943 |
| 2,340,317 | Finch | Feb. 1, 1944 |
| 2,380,482 | Tribble | July 31, 1945 |
| 2,384,263 | Schlesinger | Sept. 4, 1945 |
| 2,453,081 | Sziklai | Nov. 2, 1948 |